Feb. 10, 1959  H. C. PAULSEN  2,872,916
CEMENT HANDLING APPARATUS
Filed July 31, 1956  2 Sheets-Sheet 2
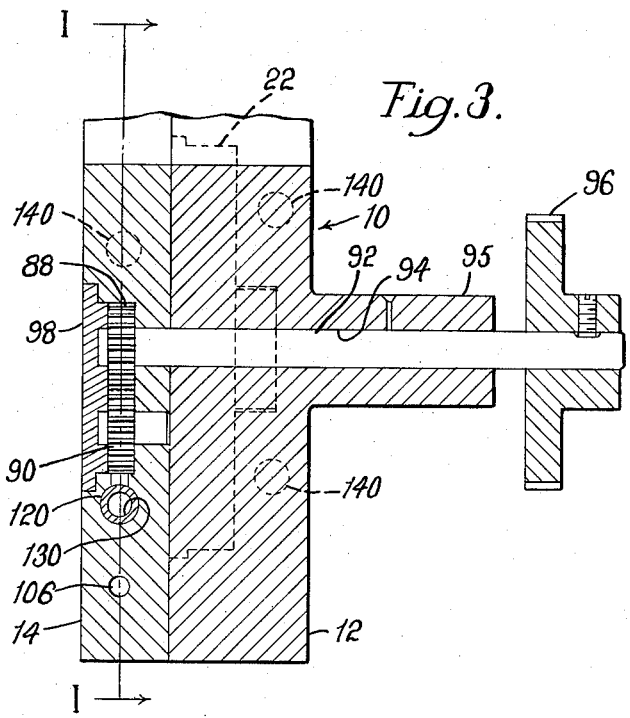
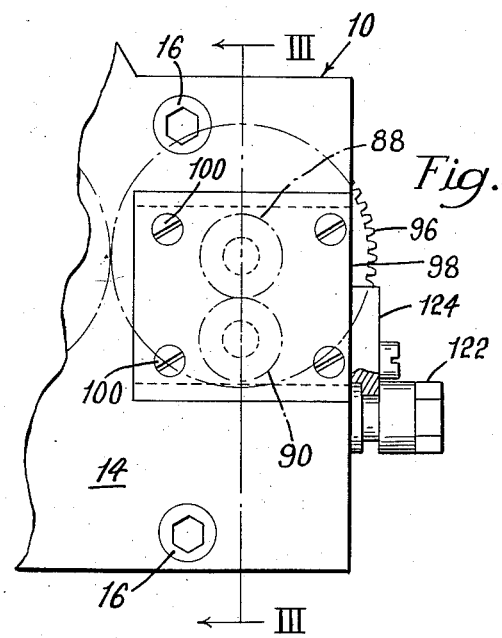
Inventor
Hans C. Paulsen
By his Attorney

United States Patent Office 2,872,916
Patented Feb. 10, 1959

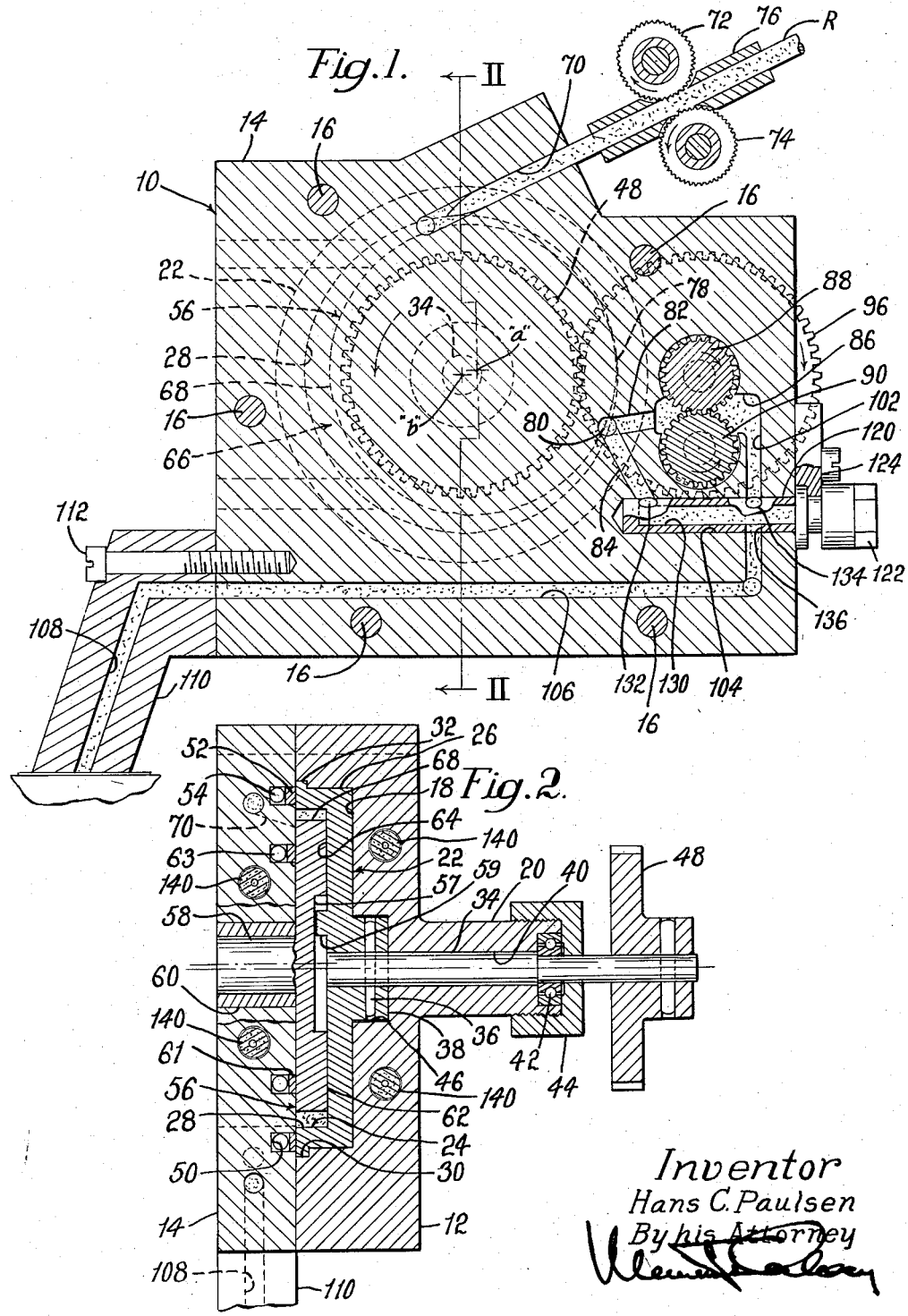

2,872,916
CEMENT HANDLING APPARATUS

Hans C. Paulsen, Lexington, Mass., assignor to United Shoe Machinery Corporation, Flemington, N. J., a corporation of New Jersey Application July 31, 1956, Serial No. 601,166

4 Claims. (Cl. 126—343.5)

This invention relates to apparatus for handling rod cement and is particularly concerned with improvements in apparatus used for this purpose wherein the rod cement is fed along and is at the same time melted by means of a rotating disk or disk-like member journaled within a heated casing, for example of the type disclosed and claimed in United States Letters Patent No. 2,765,768, granted October 9, 1956, in my name.

In apparatus of the mentioned type, it has been found, in practice, that the melting and feeding disk has a definite tendency to draw the cement along in the passage formed in the heated casing as the cement is progressively melted, i. e., the melting and feeding disk has what may be termed a "pumping action." It is a principal object of this invention to provide a novel and improved cement handling apparatus of this type wherein this pumping action is greatly augmented and the melting of the cement facilitated. With this purpose in view, the herein illustrated apparatus has a heated casing in which there is journaled a cup-shaped melting and feeding disk and having a projection extending into the open end of the recess in the cup-shaped end of the disk to provide an annular space between the outer surface of the projection and an inner surface on the disk with which an inlet and an outlet formed in the casing are in communication. More specifically, the mentioned projection is circular in shape and is journaled in the casing for rotation about an axis disposed eccentrically with respect to the axis of rotation of the disk, and means are provided for rotating the disk and the projection to cause a solid strip or rod of cement fed into the annular space through the inlet to be progressively melted and fed along within the space by the disk and by the projection and as the cement is thus progressively melted to deliver the melted cement to the outlet. Preferably, and as herein illustrated, there are associated with the heated casing annular sealing members adapted, respectively, to engage end surfaces on the cup-shaped disk and on the projection to prevent leakage of molten adhesive radially thereof.

These and other objects and features will be apparent from the following detailed description of the preferred embodiment of the invention which is illustrated in the accompanying drawings and will be pointed out in the claims.

In the drawings,

Fig. 1 is a view in side elevation of a cement handling apparatus embodying features of this invention shown in vertical section substantially on line I—I of Fig. 3 and looking in the direction of the arrows;

Fig. 2 is a view of the apparatus shown in vertical section substantially on line II—II of Fig. 1 looking in the direction of the arrows;

Fig. 3 is a view of the apparatus in vertical section substantially on line III—III of Fig. 4 and looking in the direction of the arrows, and Fig. 4 is a view in side elevation of a portion of the apparatus.

Referring to these drawings, the improved apparatus of this invention comprises a heated casing, indicated generally by the reference character 10, and including two separate members or blocks 12, 14, which are secured together in face to face relation by means of screws 16, 16. The member 12 is provided with a circular recess 18 and an outwardly extending bearing boss 20, Fig. 2. Fitted within the circular recess of the block 12 is a melting and feeding disk 22 which is generally cup-shaped due to an axially extending flange portion 24 thereof having outer and inner peripheral surfaces 26 and 28. The recess 18 is preferably counterbored, as indicated at 30, in order to receive an annular projection 32 formed on the flange 24. The disk 22 is journaled in the casing by means of a shaft 34 to which it is secured by means of a pin 36 which passes through a hub portion 38. The shaft 34 extends outwardly through a bearing bore in the bearing boss 20 and through a bearing 42 and gland nut 44 associated therewith, while the aforementioned hub portion 38 is received within a second and smaller circular recess 46 formed in the member 12. Secured to the outer end of the shaft 34 is a gear 48.

Formed in the member 14 is an annular groove 50 in which there is fitted a sealing ring 52 and an annular compressible member 54 which is adapted yieldingly to press the sealing ring 52 against the end face of the flange portion 24 of the cup-shaped disk 22, when the member 14 is secured to the other member 12 by means of the screws 16, see Fig. 2. Preferably, the sealing ring 52 and the compressible member 54 are each formed of a resilient material of a type which is adapted to withstand relatively high temperatures, such, for example, as polytetrafluoroethylene, which is known by the trade name of "Teflon." Associated with the member 14 is a disk-like projection 56, which has a stem 58 rotatably mounted within a bushing 60 pressed into a hole in the member 14, the end face 62 of this disk-like projection being substantially in contact with the bottom surface 64 of the cup-shaped disk 22. This projection is drivingly connected to the cup-shaped disk 22 by means of a diametrically disposed groove 57 in the projection and an axially extending boss 59 on the disk. Preferably, and as herein illustrated, a sealing ring 61 backed up by means of an annular compressible member 63 is provided for engaging the projection 56, as shown in Fig. 2, these members being formed of material similar to that used for the members 52 and 54, referred to above.

As will be apparent from Fig. 1, the axis of rotation "a" of the disk-like projection 56 is eccentrically disposed relatively to the axis of rotation "b" of the disk 22, so that a substantially crescent-shaped annular space 66 is provided between the outer surface 68 of the projection and the inner surface 28 of the flange 24, see Fig. 1. Leading into this space at the location indicated in Fig. 1 is an inlet passage 70 formed in the member 14, this passage extending first in a direction parallel to the end wall of the member 14 and then angling inwardly as indicated in Fig. 2 and intersecting the space 66 in a direction substantially tangential to the surface 24 of the disk 22 and at a location where the radial width of the space 66 is substantially equal to the diameter of the passage. For feeding a solid strip or rod of thermoplastic cement "R" into the space 66 through the inlet passage 70, a pair of feed rolls 72, 74 associated with the guide sleeve 76, are provided.

As shown in Fig. 1, the outer surface 68 of the projection 56 is substantially tangential to and in contact with the inner surface 28 of the flange 24 on the disk 22 at a point indicated by the reference character 78. Closely adjacent to this point, the member 14 is provided with a transversely extending passage 80 which is in communication with a discharge passage 82 and a by-pass passage 84 also formed in the member 14, the latter two passages extending parallel to the end face of this member. The discharge passage 82 is enlarged, as indicated at 86, and extending into this enlarged portion of the discharge passage are the two gears 88 and 90 of a gear pump. The gear 88 is formed on a shaft 92 which is journaled in a bore 94 provided in a second bearing boss 95, projecting from the member 12, Fig. 3, and secured to the shaft is a gear 96 which is in mesh with the gear 48, mentioned above. A plate 98 covers the gears of the gear pump, as shown in Fig. 3, this plate being held in place by means of screws 100, 100, Fig. 4. Beyond the enlarged portion 86, the discharge passage extends downwardly, as indicated at 102, through a bore 104, and thence horizontally, as indicated at 106, to a delivery passage 108 formed in a nozzle 110, which is secured to the member 14 by means of a screw 112, Fig. 1.

Rotatably mounted within the bore 104, into which the aforementioned by-pass passage 84 leads, is a by-pass valve 120 having a head portion 122 and being held in place by means of a keeper block 124. This valve is hollow, as indicated at 130 and has three ports, 132, 134 and 136. These ports are so arranged that by rotating the valve to different positions, a greater or lesser amount of the discharge from the gear pump may be returned to the discharge passage 82 on the intake side of the pump, thereby varying the quantity of adhesive delivered to the nozzle 110.

Fitted within bores in the members 12 and 14 are several electrical heating units 140 which are connected to a suitable source of electrical energy, not shown, and controlled by thermostats in the usual manner. A motor, not shown, is provided for driving one or the other of the gears 48 or 96 and this same motor is connected through a suitable drive mechanism, not shown, to one or both of the feed wheels 72, 74. Therefore, when the motor is operated the rod of cement R will be fed into the annular space 66 and this rod will be progressively melted and drawn around within the space 66 by the combined action of the cup-shaped disk 22 and the projection 60, both of which are rotated in the direction indicated by the arrow in Fig. 1. As the molten cement reaches the passage 80 it is forced into the passage inasmuch as the molten cement cannot pass beyond the point of tangency of the inner surface 28 of the flange 24 on the disk 22 and the outer surface of the projection 60. Therefore, the disk and the projection act somewhat as a pump to force molten adhesive into the discharge passage 82 from whence it is taken up by the gear pump and forced through the passage 102, 106 and the passage 108 to the nozzle 110. As will be apparent, this pumping action is augmented by the action of the three moving surfaces which are in contact with the cement, i. e., the surfaces 28 and 64 on the cup-shaped disk 22 and the surface 68 on the projection 56. The sealing ring 52 effectively prevents leakage of the molten cement radially outward along the end face of the cup-shaped disk, while the sealing ring 61 similarly prevents inward migration of the molten cement along the end face of the projection 56.

Having thus described my invention, what I claim as new and desire to secure by Letters Patent of the United States is:

1. A cement handling apparatus comprising a heated hollow casing including a pair of members secured together in face to face relation, one of said members being provided with a circular recess and having a cup-shaped melting and feeding disk journaled therein and fitted within said recess and the other of said members having a circular projection extending into the open end of said cup-shaped disk and eccentrically disposed relatively thereto to provide a substantially crescent-shaped annular space between its outer surface and an inner surface on the disk, said casing being provided with an inlet and an outlet each in communication with said space, said space gradually decreasing in cross section in the vicinity of said outlet, means for feeding a solid strip of thermoplastic cement into said space through the inlet, and means for rotating said disk to cause it to melt and feed the cement as the cement is progressively heated and to deliver the melted cement directly to the outlet.

2. A cement handling apparatus comprising a heated hollow casing including a pair of members secured together in face to face relation, one of said members being provided with a circular recess, and having a cup-shaped melting and feeding disk journaled thereon and fitted within said recess and the other of said members having a circular projection journaled thereon, said projection extending into the open end of said cup-shaped disk and being eccentrically disposed relatively thereto to provide a substantially crescent-shaped annular space between its outer surface and inner surface on the disk, said casing being provided with an inlet and outlet each in communication with said space, said space gradually decreasing in cross section in the vicinity of said outlet, means for feeding a solid strip of thermopastic cement into said space through the inlet, and means for rotating said disk and the projection to cause the cement to be melted and fed along within said space by the disk and the projection as the cement is progressively heated and to deliver the melted cement to the outlet.

3. A cement handling apparatus comprising a heated hollow casing including a pair of members secured together in face to face relation, one of said members being provided with a circular recess and having a cup-shaped melting and feeding disk journaled therein and fitted within said recess and the other of said members having a circular projection journaled thereon, the said projection extending into the open end of said cup-shaped disk and being eccentrically disposed relatively thereto to provide a substantially crescent-shaped annular space between its outer surface and an inner surface on the disk, and an annular sealing member associated with said other casing member and arranged to engage an end face of said cup-shaped disk, said casing being provided with an inlet and an outlet each in communication with said space, said space gradually decreasing in cross section in the vicinity of said outlet, means for feeding a solid strip of thermoplastic cement into said space through the inlet, and means for rotating said disk and the projection to cause the cement to be melted and fed along within said space by the disk and the projection as the cement is progressively heated and to deliver the melted cement to the outlet.

4. A cement handling apparatus comprising a heated hollow casing including a pair of members secured together in face to face relation, one of said members being provided with a circular recess and having a cup-shaped melting and feeding disk journaled thereon and fitted within said recess and the other of said members having a circular projection journaled thereon, said projection extending into the open end of said cup-shaped disk and being eccentrically disposed relatively thereto to provide a substantially crescent-shaped annular space between its outer surface and an inner surface on the disk, an annular sealing member associated with said last-mentioned casing member and arranged to engage an end surface on said projection, said casing being provided with an inlet and an outlet each in communication with said space, said space gradually decreasing in cross section in the vicinity of said outlet, means for feeding a solid strip of thermoplastic cement into said space through the inlet, and means for rotating said disk and said projection to cause the cement to be melted and fed along within said space by the disk and the projection as the cement is progressively melted and to deliver melted cement to the outlet.

References Cited in the file of this patent

UNITED STATES PATENTS 2,765,768   Paulsen _____ Oct. 9, 1956